United States Patent
Li

(10) Patent No.: US 11,405,708 B2
(45) Date of Patent: Aug. 2, 2022

(54) TYPE OF SPEAKER CABINET, AND AN EXTRUSION BLOW MOULD AND MANUFACTURING METHOD FOR A SPEAKER CABINET

(71) Applicant: TGI Technology PTE LTD, Singapore (SG)

(72) Inventor: Shihuang Li, Singapore (SG)

(73) Assignee: TGI Technology PTE LTD, Cote d'Azur (SG)

( * ) Notice: Subject to any disclaimer, the term of this patent is extended or adjusted under 35 U.S.C. 154(b) by 303 days.

(21) Appl. No.: 16/639,961

(22) PCT Filed: Aug. 14, 2018

(86) PCT No.: PCT/SG2018/050413
§ 371 (c)(1),
(2) Date: Feb. 18, 2020

(87) PCT Pub. No.: WO2019/035767
PCT Pub. Date: Feb. 21, 2019

(65) Prior Publication Data
US 2020/0252702 A1 Aug. 6, 2020

(30) Foreign Application Priority Data
Aug. 18, 2017 (CN) .......................... 201710711948.1

(51) Int. Cl.
*H04R 1/02* (2006.01)
*B29C 49/04* (2006.01)
(Continued)

(52) U.S. Cl.
CPC ............... *H04R 1/02* (2013.01); *B29C 49/04* (2013.01); *B29C 49/48* (2013.01); *B29L 2031/3418* (2013.01); *H04R 2201/029* (2013.01)

(58) Field of Classification Search
CPC .. H04R 1/02; H04R 1/2888; H04R 2201/029; H04R 1/345; H04R 1/20; H04R 1/22;
(Continued)

(56) References Cited

U.S. PATENT DOCUMENTS

2003/0024764 A1 2/2003 Fox et al.
2005/0140255 A1 6/2005 Wilson et al.
(Continued)

FOREIGN PATENT DOCUMENTS

JP 2006287310 A 10/2006

*Primary Examiner* — Alexander Krzystan
*Assistant Examiner* — Julie X Dang
(74) *Attorney, Agent, or Firm* — Hayes Soloway P.C.

(57) ABSTRACT

This invention provides a speaker cabinet, and the aforementioned speaker cabinet includes a containment space within; multiple reinforcing rib connectors pass through the space between the two faces on the inside of the aforementioned containment space with the largest area; when these two faces start moving towards or away from each other, the reinforcing rib connectors provide resistance in the opposite direction of the movement; the aforementioned cabinet and reinforcing rib connectors are created in one piece via extrusion blow moulding. The invention provides a speaker cabinet, where the total capacity of the cabinet can remain unchanged during use, and the cabinet is very light-weight, and the inner walls of the cavity are also very thin. Completely fulfils sound quality and portability requirements.

7 Claims, 4 Drawing Sheets

(51) Int. Cl.
*B29C 49/48* (2006.01)
*B29L 31/34* (2006.01)

(58) Field of Classification Search
CPC ....... H04R 1/2876; B29C 49/04; B29C 49/48; B29L 2031/3418; G10K 11/20
USPC ........................................ 381/386, 345, 353
See application file for complete search history.

(56) References Cited

U.S. PATENT DOCUMENTS

| | | |
|---|---|---|
| 2005/0169494 A1 | 8/2005 | Stiles et al. |
| 2012/0014551 A1* | 1/2012 | Ohashi ................ H04R 1/2888 381/345 |
| 2015/0319523 A1 | 11/2015 | Kano et al. |
| 2017/0307424 A1* | 10/2017 | Hies ........................ H04R 1/02 |

* cited by examiner

TYPE OF SPEAKER CABINET, AND AN EXTRUSION BLOW MOULD AND MANUFACTURING METHOD FOR A SPEAKER CABINET

CROSS-REFERENCE TO RELATED APPLICATIONS AND PRIORITY

This patent application claims priority from PCT Patent Application No. PCT/SG2018/050413 filed Aug. 14, 2018, which claims priority from CN Patent Application No. 201710711948.1 filed Aug. 18, 2017. Each of these patent applications are herein incorporated by reference in its/their entirety.

TECHNICAL FIELD OF THE INVENTION

The invention involves a speaker cabinet.

PRIOR ART

Traditionally, the weight of the speaker cabinet was intimately linked to speaker sound quality, as the larger the speaker unit of the speaker cabinet, the greater the power required to cause the speaker unit to vibrate. And the larger the speaker unit, the more sonic pressure is created in the speaker cabinet after it vibrates. The more sonic pressure created, the more likely it is that the area within the speaker cabinet will warp, becoming larger or smaller, according to the vibration. To stabilise the capacity of the speaker cabinet, the speaker cabinet walls need to be made thicker, and the materials used to produce the speaker cabinet must be fairly rigid as well. These all increased speaker cabinet quality. Meaning that it a light speaker cabinet was an oxymoron where good sound quality was concerned, and the two properties could not exist together.

DESCRIPTION OF THE INVENTION

The main technical problem the invention seeks to solve is the provision of a speaker cabinet, where the capacity of the speaker cabinet can remain unchanged during use, but the speaker cabinet is also light-weight, with thin walls. The invention completely fulfils sound quality and portability requirements.

In order to solve the aforementioned problem, the invention provides a speaker cabinet, and the aforementioned speaker cabinet includes a containment space within; multiple reinforcing rib connectors pass through the space between the two faces on the inside of the aforementioned containment space with the largest area; when these two faces start moving towards or away from each other, the reinforcing rib connectors provide resistance in the opposite direction of the movement;

The aforementioned cabinet and reinforcing rib connectors are created in one piece via extrusion mould extrusion blow moulding.

In an optimal example: the aforementioned reinforcing rib connectors are hollow shafts, and the aforementioned two faces each have apertures connecting through to the hollow shafts; and each of the aforementioned apertures are set in positions corresponding to each of the hollow shafts.

In an optimal example: the aforementioned reinforcing ribs are parallel to each other.

In an optimal example: the aforementioned cabinet is rectangular, and the aforementioned reinforcing rib connectors pass between its top and bottom faces.

The invention also provides an extrusion blow mould for producing the aforementioned speaker cabinet, which is comprised of two moulds provided symmetrically, with one side of the aforementioned two moulds being the opening face; multiple shafts extending from the face within each mould furthest from the opening face towards the direction closest to the opening face; with the aforementioned shafts being lower than the flat surface existing on the aforementioned opening face;

And when the two moulds are fitted together, there is a fixed distance between the shaft ends of the two moulds.

In an optimal example: the aforementioned mould is rectangular.

This invention also provides a method of using the aforementioned extrusion blow mould to produce a speaker cabinet, where the parison required for the extrusion blow moulding is placed between the two moulds along the lengthwise direction, and the two ends of the parison are cut off when the mould is closed, keeping it between the two moulds;

Blowing commencing into the blow port of the closed two moulds, causing the parison within the mould to expand; and during the expansion process the parison covers the inner walls of the mould and the outer walls of the shafts, forming the speaker cabinet.

The invention offers the following advantages over conventional technology:

1. The invention provides a type of speaker where the entire body of the speaker is formed in one piece via an extrusion blow moulding process, with relatively high surface tension. The speaker is quite resistant to pressure while in operation, and thus, its shape is difficult to warp. In addition, reinforcing rib connectors pass between the two faces of the speaker cabinet with the largest area and act on both, further increasing the pressure-resistant capabilities of the speaker cabinet. This enables the speaker cabinet to be light and thin, while also fulfilling the demands of a speaker cabinet to provide good sound quality.

2. The invention provides a type of speaker cabinet, where the elongated speaker cabinets can be created easily via and extrusion blow moulding process. In addition, the mould required for the extrusion blow moulding is fairly inexpensive, representing a large cost saving over traditional injection moulds. This means that the same soundbar can be placed in speaker cabinets of different lengths, allowing users to select speaker cabinets which match the length of their home television sets, making the speaker and television will be more compatible, and increasing overall integration.

3. The invention provides a type of speaker cabinet which uses reinforcing ribs to produce the cabinet of the speaker cabinet, making the capacity of the speaker cabinet very stable. The speaker cabinet can therefore take various different forms, and is not subject to the restrictions of being a pressure container. This makes it possible to make a wide variety of individual speakers via an extrusion blow moulding process.

4. The invention provides a type of speaker cabinet. As many hollow shafts naturally exist within the speaker cabinet, these shafts to provide inverted tube speakers or labyrinth speakers.

DETAILED DESCRIPTION

The technical solutions of the invention will be further described below with reference to the attached drawings.

Figure 1:
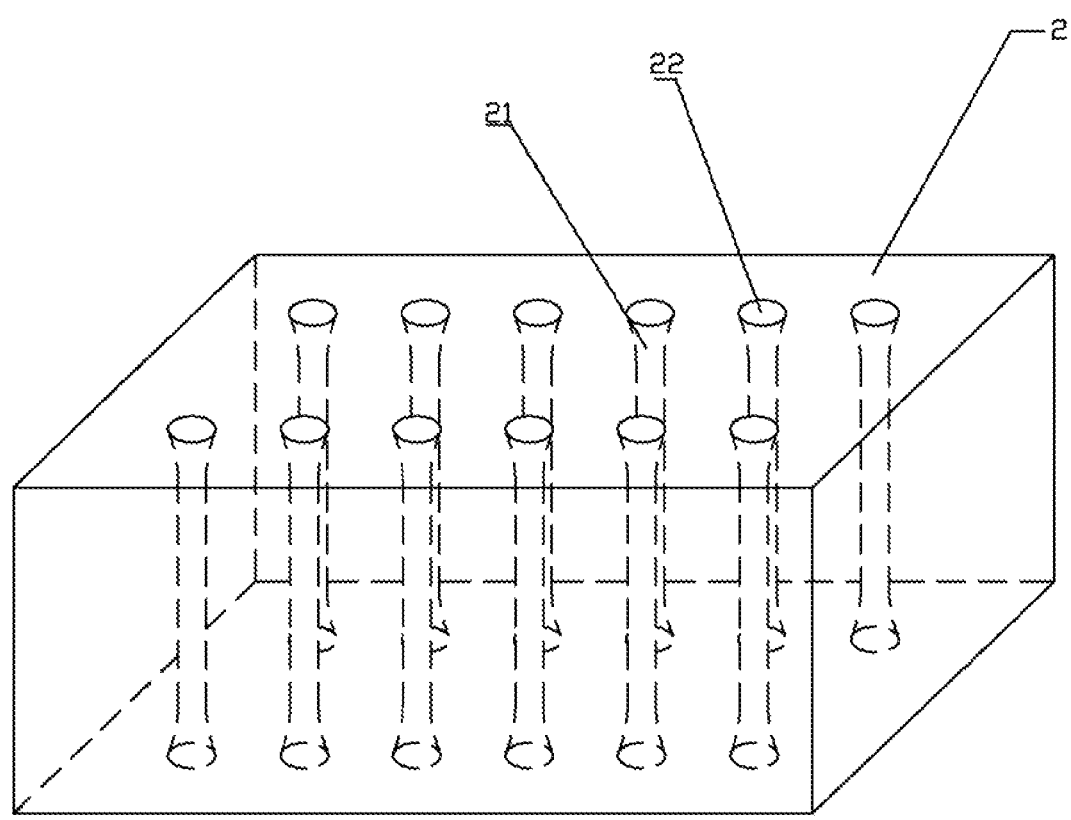
FIG. 1 is a structural diagram showing the speaker cabinet structure described in Optimal Example 1 of the invention.
Figure 2:
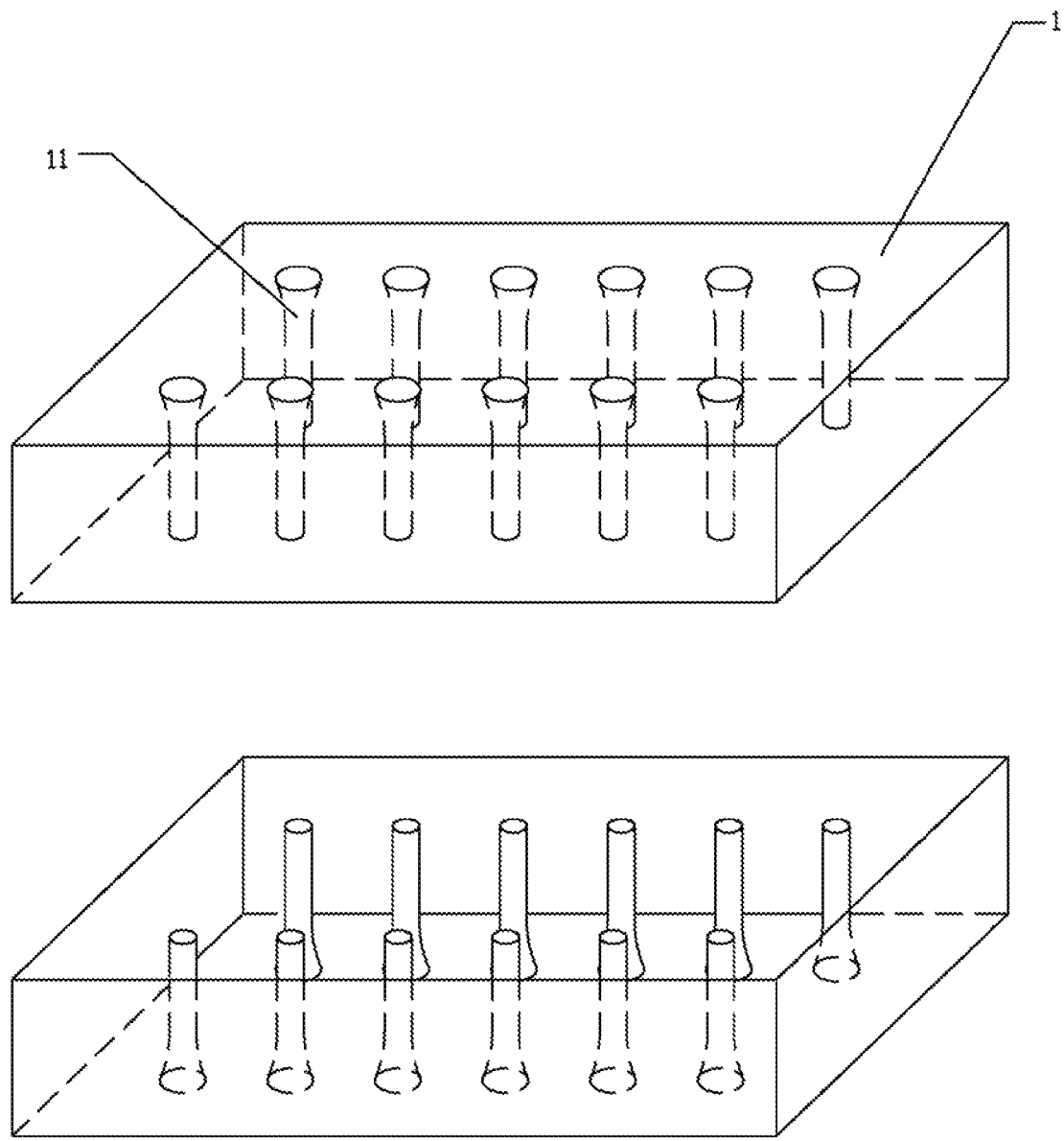
FIG. 2 is a structural diagram showing the extrusion blow mould of Optimal Example 1 of the invention.
Figure 3:
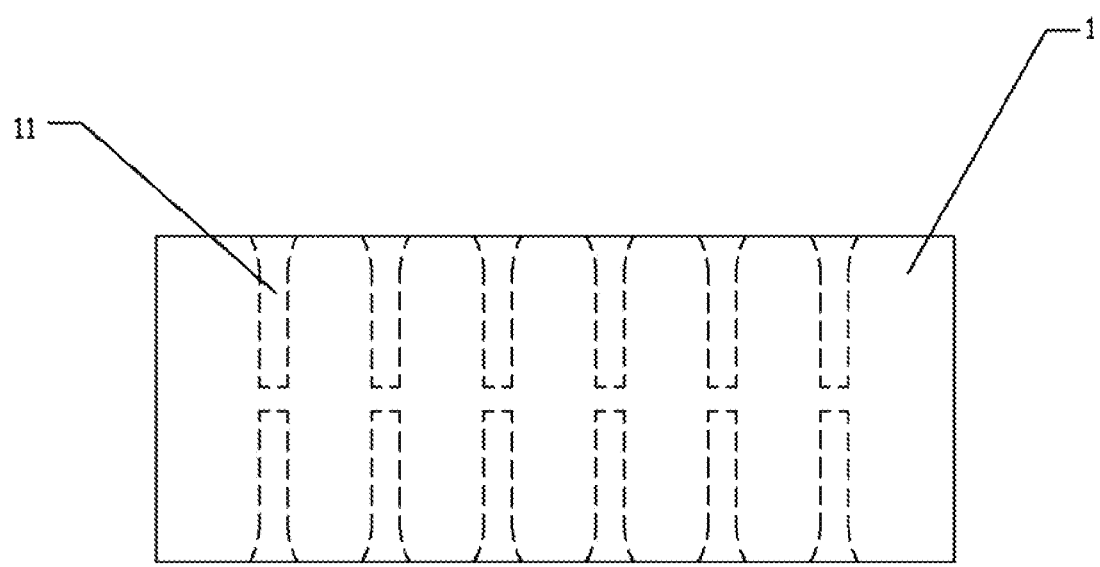
FIG. 3 is a schematic diagram showing the closed extrusion blow mould of Optimal Example 1 of the invention.

FIG. 1-3 shows an extrusion blow mould for producing a speaker cabinet, which is comprised of two moulds (1) provided symmetrically, with one side of the aforementioned two moulds (1) being the opening face; multiple shafts (11) extending from the face within each mould (1) furthest from the opening face towards the direction closest to the opening face; with the aforementioned shafts (11) being lower than the flat surface existing on the aforementioned opening face;

Therefore, when the two moulds (1) are fitted together, there is a fixed distance between the shaft (11) ends of the two moulds (1). The mould in the optimal example is rectangular, but this is only for illustrative purposes, and this can be exchanged for a mould of any other shape in practical application, as a simple exchange belonging to the example.

In the method of producing a speaker cabinet using the aforementioned extrusion blow moulds, the parison required for the extrusion blow moulding is placed between the two moulds (1) along the lengthwise direction, and the two ends of the parison are cut off when the mould (1) is closed, keeping it between the two moulds (1);

Blowing commences into the blow port of the closed two moulds (1), causing the parison within the mould (1) to expand; and during the expansion process the parison will flow through the lengthwise gaps between the shaft (11) ends, causing the parison to cover the inner walls of the mould (1) and outer walls of the shafts (11), forming the speaker cabinet (2).

The speaker cabinet (2) is formed, and includes a containment space within, where multiple reinforcing rib connectors (21) pass through the space between the two faces on the inside of the aforementioned containment space with the largest area; and when these two faces start moving towards or away from each other, the reinforcing rib connectors (21) provide resistance in the opposite direction of the movement;

The aforementioned reinforcing rib connectors (21) are hollow shafts, and the aforementioned two faces each have apertures (22) connecting through to the hollow shafts; each of the aforementioned apertures (22) are set in positions corresponding to each of the hollow shafts (21), and the aforementioned reinforcing ribs (21) are parallel to each other.

The aforementioned speaker cabinet is formed in one piece via extrusion blow moulding, has a relatively high surface tension, and has good pressure-resistant capabilities during operation, making it difficult to warp. In addition, reinforcing rib connectors pass between the two faces of the speaker cabinet with the largest area and act on both, further increasing the pressure-resistant capabilities of the speaker cabinet. This enables the speaker cabinet to be light and thin, while also fulfilling the demands of a speaker cabinet to provide good sound quality. Example 2

Figure 4:
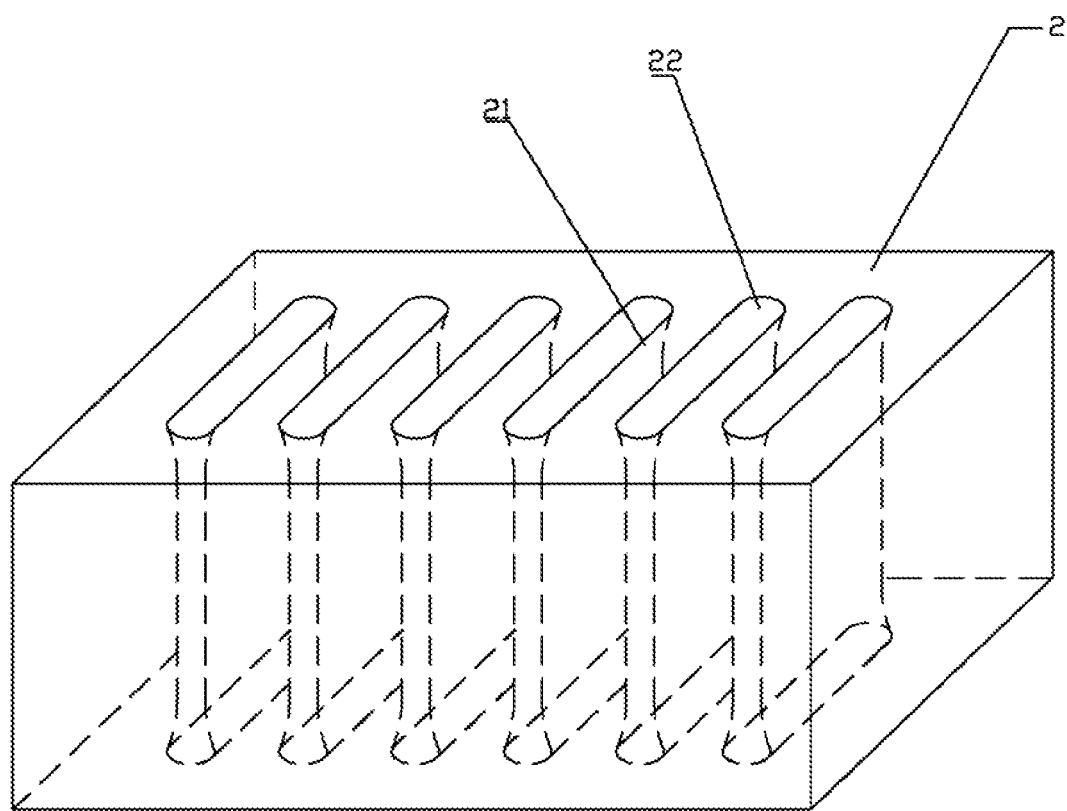
FIG. 4 is a structural diagram showing the speaker cabinet of Optimal Example 2 of the invention.

FIG. 4 shows that in this example, the reinforcing ribs are no longer hollow and cylindrical shafts, and that they are now flat and hollow shafts. This shape also achieves the action of the reinforcing ribs, and as the rest of the design is the same as that of Example 1, no further explanation will be provided.

Everything described above is only a preferred example of the invention, but the scope of the invention is not limited to this. Anyone familiar with these technologies can easily think of changes or substitutions which would fall under the scope of the technology disclosed by the invention, such as using a different type of blow moulding, and any such changes or substitutions would all be within the scope of protection given to the invention. Therefore, the scope of protection of the invention should be as the Scope of Claims.

The invention claimed is:

1. A speaker cabinet, comprising:
a containment space;
multiple reinforcing rib connectors passing through a space between two faces on an inside of the containment space; and wherein the reinforcing rib connectors dampen a movement of the two faces towards or away from each other; where the cabinet and reinforcing rib connectors are a unitary element, wherein the reinforcing rib connectors are hollow shafts, and the two faces each have apertures aligned with the hollow shafts.

2. The speaker cabinet described in claim 1, wherein the hollow shafts are flat.

3. The speaker cabinet described in claim 1, wherein the reinforcing rib connectors are parallel to each other.

4. The speaker cabinet described in claim 1, wherein the cabinet is a rectangular prism shape; and wherein the reinforcing rib connectors passing between a top face and a bottom face.

5. An extrusion blow mould for producing the speaker cabinet described in claim 1, the extrusion blow mould comprising two moulds provided symmetrically, with a first side of the two moulds being an opening face; multiple shafts extending from a face within each mould furthest from the opening face towards the direction closest to the opening face; with the aforementioned shafts being lower than a flat surface on the opening face; and wherein the two moulds are fitted together with a fixed distance between ends of the shaft of the two moulds.

6. The extrusion blow mould described in claim 5, wherein the mould is a rectangular prism.

7. A method of using the extrusion blow mould claim 5 to produce a speaker cabinet, wherein: a parison required for the extrusion blow moulding placed between the two moulds along a lengthwise direction, with two ends of the parison cut off when the mould is closed, keeping it the parison between the two moulds; blowing commencing into a blow port of the closed two moulds, causing the parison to expand; and during expansion, the parison covers inner walls of the mould and outer walls of the shafts, forming the speaker cabinet.

* * * * *